(12) United States Patent
Zhang et al.

(10) Patent No.: US 9,358,497 B2
(45) Date of Patent: Jun. 7, 2016

(54) IONIC LIQUID SOLVENT AND GAS PURIFICATION METHOD USING THE SAME

(75) Inventors: Xiangping Zhang, Beijing (CN); Yansong Zhao, Beijing (CN); Shaojuan Zeng, Beijing (CN); Suojiang Zhang, Beijing (CN); Haifeng Dong, Beijing (CN); Yingpeng Zhen, Beijing (CN); Lei Huang, Beijing (CN)

(73) Assignee: Institute of Process Engineering, Chinese Academy of Sciences, Beijing (CN)

( * ) Notice: Subject to any disclaimer, the term of this patent is extended or adjusted under 35 U.S.C. 154(b) by 588 days.

(21) Appl. No.: 13/823,707

(22) PCT Filed: Sep. 26, 2010

(86) PCT No.: PCT/CN2010/077326
§ 371 (c)(1),
(2), (4) Date: Jun. 14, 2013

(87) PCT Pub. No.: WO2012/037736
PCT Pub. Date: Mar. 29, 2012

(65) Prior Publication Data
US 2013/0255496 A1    Oct. 3, 2013

(51) Int. Cl.
*B01D 53/14* (2006.01)
(52) U.S. Cl.
CPC ........ *B01D 53/1493* (2013.01); *B01D 53/1475* (2013.01); *B01D 2252/20436* (2013.01); *B01D 2252/20478* (2013.01); *B01D 2252/30* (2013.01); *B01D 2252/602* (2013.01); *B01D 2257/2064* (2013.01); *B01D 2257/302* (2013.01); *B01D 2257/304* (2013.01); *B01D 2257/504* (2013.01); *B01D 2257/702* (2013.01); *Y02C 10/06* (2013.01)

(58) Field of Classification Search
CPC combination set(s) only.
See application file for complete search history.

(56) References Cited

U.S. PATENT DOCUMENTS

| 4,624,838 A * | 11/1986 | Pan ..................... | B01D 53/1456 423/226 |
| 2008/0025893 A1* | 1/2008 | Asprion ............. | B01D 53/1493 423/228 |
| 2012/0063977 A1* | 3/2012 | Baugh ................. | B01D 53/1475 423/228 |

FOREIGN PATENT DOCUMENTS

| CN | 1113824 A | 12/1995 |
| CN | 101671259 A | 3/2010 |
| CN | 101745290 A | 7/2010 |
| JP | 2005-254233 A | 9/2005 |

(Continued)

OTHER PUBLICATIONS

The International Search Report from PCT/CN2010/077326, dated Jul. 7, 2011 (English translation version).

(Continued)

*Primary Examiner* — Duane Smith
*Assistant Examiner* — Adam W Bergfelder
(74) *Attorney, Agent, or Firm* — Kilpatrick Townsend & Stockton LLP

(57) ABSTRACT

An ionic liquid solvent and gas purification method using the same are provided. The ionic liquid solvent consists of a main absorbent, a regulator for the main absorbent, an auxiliary absorbent, an activator, an antioxidant and water. The ionic liquid involves a low synthetic cost, low viscosity and high absorption capacity, and can be easily regenerated and recycled. The method, compared with traditional processes, has advantages such as a greater absorption capability and lower operation cost.

17 Claims, 2 Drawing Sheets

(56) References Cited

FOREIGN PATENT DOCUMENTS

JP          2007-222847 A      9/2007
WO       2009/143376 A3     11/2009
WO       2010/089257 A1     8/2010

OTHER PUBLICATIONS

Zhang et al.; "A novel ionic liquids-based scrubbing process for efficient CO2 capture"; *Sci. China Chem.*; 53(7):1549-1553 (Jul. 2010).

Zhao et al.; "Density, Viscosity, and Performances of Carbon Dioxide Capture in 16 Absorbents of Amine + Ionic Liquid + H2O, Ionic Liquid + H2O, and Amine + H2O Systems"; *J. Chem. Eng. Data*; 55:3513-3519 (2010) ePub Jun. 28, 2010.

Zhao, et al., "Density, Viscosity, and Performances of Carbon Dioxide Capture in 16 Absorbents of Amine + Ionic Liquid + $H_2O$, Ionic Liquid + $H_2O$, and Amine + $H_2O$ Systems," *J. Chem. Eng. Data*, vol. 55, pp. 3513-3519 (2010).

\* cited by examiner

US 9,358,497 B2

IONIC LIQUID SOLVENT AND GAS PURIFICATION METHOD USING THE SAME

This application is the U.S. National Phase entry under 35 U.S.C. §371 and claims the benefit of International Application No. PCT/CN2010/077326, filed Sep. 26, 2010, which is incorporated herein by reference in its entirety for all purposes.

FIELD OF THE INVENTION

The invention mainly relates to a gas purification process using an ionic liquid solvent; and more specifically, to a novel ionic liquid solvent and a gas purification method using the same.

BACKGROUND OF THE INVENTION

Recently, ionic liquid solvents, as novel "green" solvents, have been widely applied to fields of separation, catalysis, gas absorption and so on, and become ideal solvents for gas purification, due to their advantages such as good reusability, low volatility, less pollution, low energy consumption, adjustable structures and properties, superior physical and chemical stability, and environmental friendliness.

Currently, most absorbents used for purifying gases such as carbon dioxide are alkylolamine compounds or mixtures thereof, which are accompanied with many shortages, e.g. high energy consumption, great loss of absorbents caused by volatilization, and the like. And purification of gases such as carbon dioxide with a conventional ionic liquid alone may also cause the problems such as a high viscosity of the solvent and a low transfer efficiency, etc. Thereby, it is necessary to develop an ionic liquid solvent that has a low viscosity; is suitable for purifying gases such as carbon dioxide, sulfur dioxide, hydrogen chloride, hydrogen sulfide, etc.; has a great absorption capability and is more easy for the desorption of absorbed gases than the traditional processes; and has a low energy consumption, a high stability and a high reusability.

DISCLOSURE OF THE INVENTION

One aspect of the invention relates to a novel ionic liquid solvent for gas purification and separation. The ionic liquid solvent according to the invention consists of a main absorbent, a regulator for the main absorbent, an auxiliary absorbent, an activator, an antioxidant and water. The ionic liquid solvent comprises 2-95 wt % of alkylolamine functionalized ionic liquid as the main absorbent; 0-30 wt % of heterocyclic ionic liquid or amino acid ionic liquid as the regulator for the main absorbent; 0.1-30 wt % of alkylolamine organic solvent as the auxiliary absorbent; 0-5 wt % of activator; 0.1-1 wt % of antioxidant and 0.1-50 wt % of water.

Another aspect of the invention relates to a gas purification method using the ionic liquid solvent. In this method, the above ionic liquid solvent is used, wherein the ionic liquid solvent may absorb gas under a pressure of 0.1 MPa-10 MPa, at a temperature of 1° C.-98° C.; and desorb gas under a pressure of 0.1 MPa-5 MPa, at a temperature of 40° C.-300° C.

The practical application of the novel ionic liquid solvent according to the invention involves a low-temperature absorption and heat regeneration process. The ionic liquid used therein has a low synthetic cost, a low viscosity and a high absorption capacity, and can be easily regenerated and recycled. Compared with traditional processes, utilization of this solvent together with the traditional absorption and regeneration procedure for purifying gas has many advantages, such as a greater absorption capability, lower energy consumption and lower operation cost, etc.

SPECIFIC MODE FOR CARRYING OUT THE INVENTION

Figure 1:
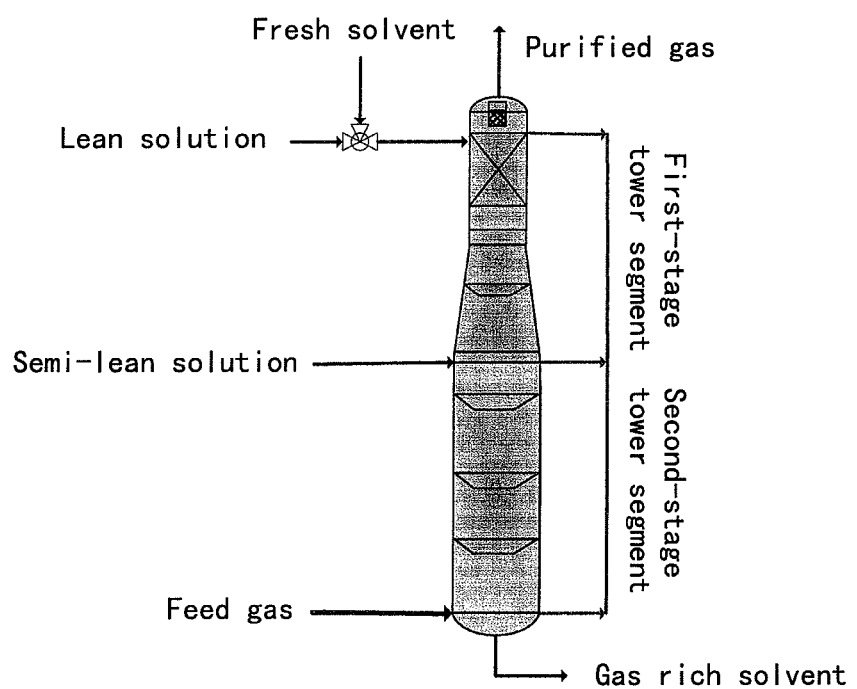
FIG. 1 is a schematic diagram showing a multistage absorption tower for gas purification used in the gas purification method based on the ionic liquid solvent according to the invention.

In the ionic liquid solvent according to the invention, the main absorbent consists of one or more of alkylolamine ionic liquids having a structural formula of AB, wherein A has a structural formula shown as follow:

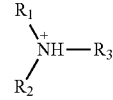

wherein $R_1$, $R_2$, $R_3$ satisfy the following requirements: $R_1$ is $C_nH_{2n+1}OH$ ($1 \leq n \leq 15$), $R_2$ and $R_3$ are H or $C_mH_{2m+1}(OH)_x$ ($1 \leq m \leq 15$, $x=1$ or $0$), respectively; and B is one or more anions selected from the group consisting of $Cl^-$, $Br^-$, $F^-$, $BF_4^-$, $PF_6^-$, $OH^-$, $CO_3^{2-}$, $HCO_3^-$, $CH_3COO^-$, $RCOO^-$, $RO^-$, $PhO^-$, $Tf_2N^-$, $CF_3SO_3^-$, $SbF_6^-$, $SO_4^{2-}$, $HSO_4^-$, $PO_4^{3-}$, $H_2PO_4^-$, $FeCl_4^-$, $AlCl_4^-$, $AlBr_4^-$, $AlI_4^-$, $SCN^-$, $NO_3^-$, and $CF_3CF_2CF_2CF_2SO_3^-$. In the invention, a better gas purification effect can be achieved where the main absorbent has a concentration of 2-95%. Additionally, in the case that the main absorbent has a concentration of 2-95%, less energy is consumed during desorption. The more preferable concentration range of the main absorbent is 25-80 wt %.

Heterocyclic ionic liquid or amino acid ionic liquid can be used as the regulator for the main absorbent. The cation of the heterocyclic ionic liquid mainly includes one or more cations of heterocyclic compounds selected from the group consisting of spiropyrans, furans, pyridines, thiophenes, imidazoles, pyrroles, pyrazoles, azoles, thiazoles, indoles, pyrazines, pyridazines, quinolines, morpholines, quinazolines, piperazines, piperidines, oxazoles, oxazolines, oxazines. The anion of the heterocyclic ionic liquid mainly includes one or more selected from the group consisting of $Cl^-$, $Br^-$, $I^-$, $BF_4^-$, $PF_6^-$, $OH^-$, $CO_3^{2-}$, $HCO_3^-$, $CH_3COO^-$, $RCOO^-$, $RO^-$, $PhO^-$, $Tf_2N^-$, $CF_3SO_3^-$, $SbF_6^-$, $SO_4^{2-}$, $HSO_4^-$, $PO_4^{3-}$, $H_2PO_4^-$, $FeCl_4^-$, $AlCl_4^-$, $AlBr_4^-$, $AlI_4^-$, $SCN^-$, $NO_3^-$ and $CF_3CF_2CF_2CF_2SO_3^-$. In the invention, the regulator can be used to modulate the physicochemical properties, such as viscosity, density, acidic and basic capacity and corrosivity of the main absorbent. The concentration range of the regulator can be elected properly within a range of 0-30 wt %, more preferably 0.1-10 wt % and most preferably 0.5-5 wt %, based on the physicochemical properties of the ionic liquid solvent after the regulator is added.

In the invention, the auxiliary absorbent is an alkylolamine organic solvent consisting of one or more substances having a structural formula shown as follow, such as ethanolamine, diethanolamine, triethanolamine, N-methyldiethanolamine and diethylene glycol amine:

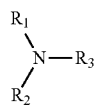

wherein $R_1$, $R_2$, $R_3$ satisfy the following requirements: $R_1$ is $C_nH_{2n+1}OH$ (1≤n≤15), $R_2$ and $R_3$ are H or $C_mH_{2m+1}(OH)_x$ (1≤m≤15, x=1 or 0), respectively. The amount of the gas purified by the ionic liquid solvent per unit weight can be sufficiently increased while the auxiliary absorbent is used. However, if too much auxiliary absorbent is used, the gas purification effect of the ionic liquid solvent can also be affected. Therefore, the concentration range of the auxiliary absorbent is preferably 0.5-30 wt %, and more preferably 0.5-20 wt %.

In the invention, the activator is one or more of aminoacetic acid, imidazole, methylimidazole, sulfolane, piperazine, hydroxyethyl diamine, ethylenediamine, tetramethylpropylenediamine and derivatives thereof. The activator can effectively increase the gas purification rate of the ionic liquid solvent per unit weight. Preferably, it has a concentration of 0-5 wt %.

The antioxidant is composed of one or more of hydroquinone, tannin and anthraquinone, and can be used to improve the stability of the ionic liquid solvent. Without affecting other features of the ionic liquid solvent, the antioxidant has a concentration of 0.1-1 wt % properly.

In the invention, the ionic liquid solvent consisting of the above components can absorb gas under a pressure of 0.1 MPa-10 MPa, at a temperature of 1° C.-98° C.; and desorb gas under a pressure of 0.1 MPa-5 MPa, at a temperature of 40° C.-300° C. Therefore, using the ionic liquid solvent according to the invention, a gas purification method based on the ionic liquid solvent can be provided.

The gas purification method according to the invention can be used for many gases, including one or more of carbon dioxide, sulfur dioxide, hydrogen chloride, hydrogen sulfide, oxynitride ($NO_x$), sulfoxide ($SO_x$), ammonia, hydrogen, carbon monoxide, methane, ethane, propane, methyl ether, diethyl ether, ethylene, propylene, acetylene, formaldehyde, formic acid, monochloromethane, dichloromethane, chlorine, and oxygen. The ionic liquid solvent of the invention is particularly efficient for removing acidic gases such as carbon dioxide, etc. but may also be used for gases other than acidic gases, including the neutral gases or some alkalescent gases mentioned above.

The gas purification method using the ionic liquid solvent according to the invention is further described hereinafter by referring to FIGS. 1 and 2.

In the purification process of the invention, a multi-segment tower is used for the gas purification, so as to reduce the energy consumed during gas absorption. The multi-segment absorption tower used in the invention has excellent operation flexibility. In other words, one-segment, two-segment, or even multiple-segment absorption can be carried out. As an example, a two-segment absorption tower is illustrated hereinafter, and its mechanism is set forth as follows. As shown in FIG. 1, a two-segment absorption tower is composed essentially of two segments, i.e. an upper tower segment and a lower tower segment (first-stage and second-stage tower segments), and equipped with a device therein for displaying and controlling the temperature and pressure; a device for displaying the temperature and pressure and a device for controlling material amount are installed in the feeding port and the discharge port. A transition layer may be disposed between different tower segments. The multistage absorption tower can be a bubble tower, a packed tower, or an empty tower. The tower body is made of alloy steel, and its inner wall is coated with an anticorrosion material, mainly including zinc metasilicate coating, red lead alkyd antirust primer, iron oxide red alkyd antirust primer, micaceous iron oxide alkyd antirust primer, or intermediate coat, alkyd enamel, epoxy red lead paint, epoxy zinc rich paint, epoxy iron oxide red paint, epoxy phosphate paint, epoxy micaceous iron oxide paint, perfluorocarbon coating, silicone coating. The process of feeding the two-segment absorption tower is shown in FIG. 1.

As an example, a two-segment absorption/desorption process is illustrated to set forth the process flow of the invention. As shown in FIG. 2, a fresh solvent and a lean solution, after mixed, are fed through the upper segment of the multistage absorption tower; and a semi-lean solution is fed through the middle of the tower. The two feeding flows are contacted with and absorb the feed gas from the bottom of the tower in a countercurrent. The purified gas is discharged from the top of the tower and enters into the purified gas separator, so as to remove the liquid carried thereby. The absorbed gas enters into the liquid phase and forms a rich liquid stream. Then the rich liquid stream is discharged from the bottom of the tower and enters into a rich liquid flasher to remove other gases carried thereby. After that, the rich liquid stream is passed through a solvent heat exchanger and enters into the upper segment of a desorption tower. In the desorption tower, the rich liquid stream desorbs thermally and the desorbed gas is discharged from the top of the tower. The discharged gas then is passed through a regeneration cooler and enters a regeneration gas separator to generate a highly purified regeneration gas. The liquid at the bottom of the separator is discharged into the bottom of a stripping regeneration tower, and further thermally desorbs. Then a full lean solution is obtained, and discharged from the bottom of the tower. Subsequently, the full lean solution, after subjected to a heat exchange with a semi-lean solution discharged from the lower segment of the desorption tower, is passed through a solvent pump and a heat exchanger, mixed with a fresh solvent, then recycled. The semi-lean solution after the heat exchange is pumped directly into the middle segment of the absorption tower and recycled.

In the above process, the multistage absorption tower and desorption tower contain a high temperature and high pressure resistant material which is ceramics or butyl rubber; the multistage absorption tower is equipped with a high temperature and high pressure resistant spray line; the multistage absorption tower and desorption tower are equipped with stirring apparatus; and the multistage absorption tower, desorption tower, regeneration cooler, regeneration gas separator and purified gas separator are equipped with heat exchange devices and, optionally with demisters made of high temperature and high pressure resistant glass or ceramics. In addition, the multistage absorption tower can be equipped with a duster and a sedimentation tank; and the desorption tower can be equipped with a sedimentation tank.

Preferably, the multistage absorption tower and desorption tower have continuously distributed scale-like structures inside. The scale-like structures have trapezoidal or rounded cross sections.

The invention is further illustrated by referring to following Examples. However, the invention is not limited to the following Examples. Without deviation from the spirit of the invention, any modification falls within the scope of the invention.

EXAMPLE 1

The experimental device consisted of a four-neck flask, a reflux condensing tube, a mechanical stirrer and a mercurial thermometer. First, 105.14 g of diethanolamine and 219.612 g of tetrafluoroboric acid (with a percentage by weight of 40 wt %) were weighted accurately. Then the diethanolamine, after dissolved in 27.1 ml ethanol, was added into the four-neck flask. The tetrafluoroboric acid was mixed with 56.2 ml ethanol, and then placed into a dropping funnel. After the mechanical stirrer was turned on, the tetrafluoroboric acid solution was dripped by the dropping funnel slowly into the diethanolamine solution with stirring. The dripping was accomplished in 30 min. The mixture was allowed to react at normal temperature and pressure for 24 hours, and the temperature inside the reactor was indicated by the mercurial thermometer. Finally, the resultant liquid was dried in a vacuum dryer at 50° C. for 40 hours. Then, 192.912 g of ionic liquid $NH_2(CH_2CH_2OH)_2BF_4$ was obtained, and the yield was 99.97%.

EXAMPLE 2

The experimental device was same as above. First, 61.08 g of ethanolamine and 219.613 g of tetrafluoroboric acid were weighted accurately. Then the ethanolamine, after dissolved in 12.9 ml ethanol, was added into the four-neck flask. The tetrafluoroboric acid was mixed with 56.3 ml ethanol, and then placed into a dropping funnel. After the mechanical stirrer was turned on, the tetrafluoroboric acid solution was dripped by the dropping funnel slowly into the ethanolamine solution with stirring. The dripping was accomplished in 30 min. The mixture was allowed to react at normal temperature and pressure for 24 hours. Finally, the resultant liquid was dried in a vacuum dryer at 50° C. for 40 hours. Then, 148.830 g of ionic liquid $NH_3(CH_2CH_2OH)BF_4$ was obtained, and the yield was 99.94%.

EXAMPLE 3

The experimental device was same as above. First, equivalent amounts of 149.192 g of triethanolamine and 219.602 g of tetrafluoroboric acid were weighted accurately. Then the triethanolamine, after dissolved in 31.5 ml ethanol, was added into the four-neck flask. The tetrafluoroboric acid was mixed with 56.1 ml ethanol, and then placed into a dropping funnel. After the mechanical stirrer was turned on, the tetrafluoroboric acid solution was dripped by the dropping funnel slowly into the triethanolamine solution with stirring. The dripping was accomplished in 30 min. The mixture was allowed to react at normal temperature and pressure for 24 hours. Finally, the resultant liquid was dried in a vacuum dryer at 50° C. for 40 hours. Then, 237.001 g of ionic liquid $NH(CH_2CH_2OH)_3BF_4$ was obtained, and the yield was 99.99%.

EXAMPLE 4

The experimental device was same as above. First, equivalent amounts of 119.202 g of N-methyldiethanolamine and 95.947 g of hydrochloric acid were weighted accurately. Then the N-methyldiethanolamine, after dissolved in 25.2 ml ethanol, was added into the four-neck flask. The hydrochloric acid was mixed with 56.3 ml ethanol, and then placed into a dropping funnel. After the mechanical stirrer was turned on, the hydrochloric acid solution was dripped by the dropping funnel slowly into the N-methyldiethanolamine solution with stirring. The dripping was accomplished in 30 min. The mixture was allowed to react at normal temperature and pressure for 24 hours. Finally, the resultant liquid was dried in a vacuum dryer at 50° C. for 40 hours. Then, 155.7 g of ionic liquid $(CH_3)NH(CH_2CH_2OH)_2Cl$ was obtained, and the yield was 99%.

EXAMPLE 5

The experimental device was same as above. First, equivalent amounts of 119.202 g of N-methyldiethanolamine and 145.972 g of hexafluorophosphoric acid were weighted accurately. Then the N-methyldiethanolamine, after dissolved in 25.2 ml ethanol, was added into the four-neck flask. The hexafluorophosphoric acid was mixed with 30.7 ml ethanol, and then placed into a dropping funnel. After the mechanical stirrer was turned on, the hexafluorophosphoric acid solution was dripped by the dropping funnel slowly into the N-methyldiethanolamine solution with stirring. The dripping was accomplished in 30 min. The mixture was allowed to react at normal temperature and pressure for 24 hours. Finally, the resultant liquid was dried in a vacuum dryer at 50° C. for 40 hours. Then, 265.102 g of ionic liquid $(CH_3)NH(CH_2CH_2OH)_2PF_6$ was obtained, and the yield was 99.97%.

EXAMPLE 6

The device for absorption experiment mainly consisted of an absorption reaction kettle and a gas chromatograph. A certain amount of ethanolamine and water (in a ratio by weight of 3/7) (about 600 ml) were weighted, mixed homogeneously, and poured into the absorption reaction kettle. A mixed gas of $N_2$ and $CO_2$ was fed quantitatively using a gas mass flowmeter, wherein the flow rate was 300 ml/min for $N_2$ and 100 ml/min for $CO_2$. The absorption was conducted at a temperature of 30° C. and under a pressure of 1.6 MPa. During the absorption process, the absorption of $CO_2$ was detected by the online gas chromatograph, until the $CO_2$ absorption equilibrium was achieved. The equilibrium time was about 8-10 hours. Based on the data recorded by the gas chromatograph, an absorption capacity of 0.0530 g $CO_2$/g of absorbent was calculated.

EXAMPLE 7

The device for absorption experiment mainly consisted of an absorption reaction kettle and a gas chromatograph. A certain amount of diethanolamine and water (in a ratio by weight of 3/7) (about 600 ml) were weighted, mixed homogeneously, and poured into the absorption reaction kettle. A mixed gas of $N_2$ and $CO_2$ was fed quantitatively using a gas mass flowmeter, wherein the flow rate was 300 ml/min for $N_2$ and 100 ml/min for $CO_2$. The absorption was conducted at a temperature of 30° C. and under a pressure of 1.6 MPa. During the absorption process, the absorption of $CO_2$ was detected by the online gas chromatograph, until the $CO_2$ absorption equilibrium was achieved. The equilibrium time was about 8-10 hours. Based on the data recorded by the gas chromatograph, an absorption capacity of 0.0853 g $CO_2$/g of absorbent was calculated.

EXAMPLE 8

The device for absorption experiment mainly consisted of an absorption reaction kettle and a gas chromatograph. A certain amount of triethanolamine and water (in a ratio by weight of 3/7) (about 600 ml) were weighted, mixed homogeneously, and poured into the absorption reaction kettle. A mixed gas of $N_2$ and $CO_2$ was fed quantitatively using a gas mass flowmeter, wherein the flow rate was 300 ml/min for $N_2$ and 100 ml/min for $CO_2$. The absorption was conducted at a temperature of 30° C. and under a pressure of 1.6 MPa. During the absorption process, the absorption of $CO_2$ was detected by the online gas chromatograph, until the $CO_2$ absorption equilibrium was achieved. The equilibrium time was about 8-10 hours. Based on the data recorded by the gas chromatograph, an absorption capacity of 0.110 g $CO_2$/g of absorbent was calculated.

EXAMPLE 9

Ionic liquid of ethanolamine trifluoromethylsulphonate $NH_3(CH_2CH_2OH)CF_3SO_3$ was synthesized using the same method as that in the above synthesis Example; and dried in a vacuum dryer for dehydration. A certain amount of ethanolamine trifluoromethylsulphonate, ethanolamine, imidazole, tannin and water (in a ratio by weight of 70/2/1/0.5/26.5) (about 600 ml) were weighted accurately, mixed homogeneously, and poured into the absorption reaction kettle. A mixed gas of $N_2$ and $CO_2$ was fed quantitatively using a gas mass flowmeter, wherein the flow rate was 300 ml/min for $N_2$ and 100 ml/min for $CO_2$. The absorption was conducted at a temperature of 30° C. and under a pressure of 1.6 MPa. During the absorption process, the absorption of $CO_2$ was detected by the online gas chromatograph, until the $CO_2$ absorption equilibrium was achieved. The equilibrium time was about 8-10 hours. Based on the data recorded by the gas chromatograph, an absorption capacity of 0.125 g $CO_2$/g of absorbent was calculated.

EXAMPLE 10

The synthesized ionic liquid of diethanolamine fluoroborate $NH_2(CH_2CH_2OH)_2 BF_4$ was dried in a vacuum dryer for dehydration. A certain amount of diethanolamine fluoroborate, ethanolamine, imidazole, tannin and water (in a ratio by weight of 70/2/1/0.5/26.5) (about 600 ml) were weighted accurately, mixed homogeneously, and poured into the absorption reaction kettle. A mixed gas of $N_2$ and $CO_2$ was fed quantitatively using a gas mass flowmeter, wherein the flow rate was 300 ml/min for $N_2$ and 100 ml/min for $CO_2$. The absorption was conducted at a temperature of 30° C. and under a pressure of 1.6 MPa. During the absorption process, the absorption of $CO_2$ was detected by the online gas chromatograph, until the $CO_2$ absorption equilibrium was achieved. The equilibrium time was about 8-10 hours. Based on the data recorded by the gas chromatograph, an absorption capacity of 0.137 g $CO_2$/g of absorbent was calculated.

EXAMPLE 11

Ionic liquid of triethanolamine bromide $NH(CH_2CH_2OH)_3Br$ was synthesized using the same method as that in the above synthesis Example; and dried in a vacuum dryer for dehydration. A certain amount of triethanolamine bromide, ethanolamine, imidazole, tannin and water (in a ratio by weight of 70/2/1/0.5/26.5) (about 600 ml) were weighted accurately, mixed homogeneously, and poured into the absorption reaction kettle. A mixed gas of $N_2$ and $CO_2$ was fed quantitatively using a gas mass flowmeter, wherein the flow rate was 300 ml/min for $N_2$ and 100 ml/min for $CO_2$. The absorption was conducted at a temperature of 30° C. and under a pressure of 1.6 MPa. During the absorption process, the absorption of $CO_2$ was detected by the online gas chromatograph, until the $CO_2$ absorption equilibrium was achieved. The equilibrium time was about 8-10 hours. Based on the data recorded by the gas chromatograph, an absorption capacity of 0.155 g $CO_2$/g of absorbent was calculated.

EXAMPLE 12

Ionic liquid of ethanolamine trifluoromethylsulphonate $NH_3(CH_2CH_2OH)CF_3SO_3$ was synthesized using the same method as that in the above synthesis Example; and dried in a vacuum dryer for dehydration. A certain amount of ethanolamine trifluoromethylsulphonate, ethanolamine, imidazole, tannin and water (in a ratio by weight of 68/0.5/1/0.5/30) (about 600 ml) were weighted accurately, mixed homogeneously, and poured into the absorption reaction kettle. A mixed gas of $N_2$ and $CO_2$ was fed quantitatively using a gas mass flowmeter, wherein the flow rate was 300 ml/min for $N_2$ and 100 ml/min for $CO_2$. The absorption was conducted at a temperature of 30° C. and under a pressure of 1.6 MPa. During the absorption process, the absorption of $CO_2$ was detected by the online gas chromatograph, until the $CO_2$ absorption equilibrium was achieved. The equilibrium time was about 8-10 hours. Based on the data recorded by the gas chromatograph, an absorption capacity of 0.134 g $CO_2$/g of absorbent was calculated.

EXAMPLE 13

The synthesized ionic liquid of diethanolamine hydrochloride $NH_2(CH_2CH_2OH)_2Cl$ was dried in a vacuum dryer for dehydration, and then poured into the absorption reaction kettle (about 600 ml). A mixed gas of $N_2$ and $CO_2$ was fed quantitatively using a gas mass flowmeter, wherein the flow rate was 300 ml/min for $N_2$ and 100 ml/min for $CO_2$. The absorption was conducted at a temperature of 40° C. and under a pressure of 1.6 MPa. During the absorption process, the absorption of $CO_2$ was detected by the online gas chromatograph, until the $CO_2$ absorption equilibrium was achieved. The equilibrium time was about 8-10 hours. Based on the data recorded by the gas chromatograph, an absorption capacity of 0.127 g $CO_2$/g of absorbent was calculated.

EXAMPLE 14

Diethanolamine, tannin and water (in a ratio by weight of 30/0.5/69.5) (about 600 ml) were weighted accurately, mixed homogeneously, and poured into the absorption reaction kettle. A mixed gas of $N_2$ and $CO_2$ was fed quantitatively using a gas mass flowmeter, wherein the flow rate was 300 ml/min for $N_2$ and 100 ml/min for $CO_2$. The absorption was conducted at a temperature of 30° C. and under a pressure of 1.6 MPa. During the absorption process, the absorption of $CO_2$ was detected by the online gas chromatograph, until the $CO_2$ absorption equilibrium was achieved. The equilibrium time was about 8-10 hours. Based on the data recorded by the gas chromatograph, an absorption capacity of 0.129 g $CO_2$/g of absorbent was calculated.

EXAMPLE 15

Diethanolamine hydrochloride, diethanolamine, tannin and water (in a ratio by weight of 30/30/0.5/39.5) (about 600 ml) were weighted accurately, mixed homogeneously, and poured into the absorption reaction kettle. Then, 5-15 mL of amino acid ionic liquid of 3-propylamino tributyl phosphonium amino acid salt was added as a regulator for the main absorbent. A mixed gas of $N_2$ and $CO_2$ was fed quantitatively using a gas mass flowmeter, wherein the flow rate was 300 ml/min for $N_2$ and 100 ml/min for $CO_2$. The absorption was conducted at a temperature of 30° C. and under a pressure of 1.6 MPa. During the absorption process, the absorption of CO₂ was detected by the online gas chromatograph, until the CO₂ absorption equilibrium was achieved. The equilibrium time was about 5-6 hours, which excelled the scenario before addition of the regulator for the main absorbent (i.e. Example 14). Based on the data recorded by the gas chromatograph, an absorption capacity of 0.162 g CO₂/g of absorbent was calculated, which also excelled the scenario before addition of the regulator for the main absorbent.

EXAMPLE 16

Diethanolamine hydrochloride, diethanolamine, tannin and water (in a ratio by weight of 30/30/0.5/39.5) (about 600 ml) were weighted accurately, mixed homogeneously, and poured into the absorption reaction kettle. Then, 5-15 mL of heterocyclic ionic liquid of 1-octyl-3-methylimidazole bis(trifluoromethylsulfonylimide)OmimTf₂N was added as a regulator for the main absorbent. A mixed gas of N₂ and CO₂ was fed quantitatively using a gas mass flowmeter, wherein the flow rate was 300 ml/min for N₂ and 100 ml/min for CO₂. The absorption was conducted at a temperature of 30° C. and under a pressure of 1.6 MPa. During the absorption process, the absorption of CO₂ was detected by the online gas chromatograph, until the CO₂ absorption equilibrium was achieved. The equilibrium time was about 5-6 hours, which excelled the scenario before addition of the regulator for the main absorbent (i.e. Example 14). Based on the data recorded by the gas chromatograph, an absorption capacity of 0.158 g CO₂/g of absorbent was calculated, which also excelled the scenario before addition of the regulator for the main absorbent.

EXAMPLE 17

The ionic liquid solvents of Examples 6-12 saturated with carbon dioxide were desorbed by the N₂ stripping method. N₂ was fed quantitatively using a gas mass flowmeter, wherein the flow rate of N₂ was 300 ml/min. The desorption was conducted at a temperature of 70° C.-90° C. and under a pressure of 0.1-0.5 MPa. During the desorption process, the desorption of CO₂ was detected by the online gas chromatograph. It was found that CO₂ was desorbed completely after about two hours.

PROCESS EXAMPLE

Figure 2:
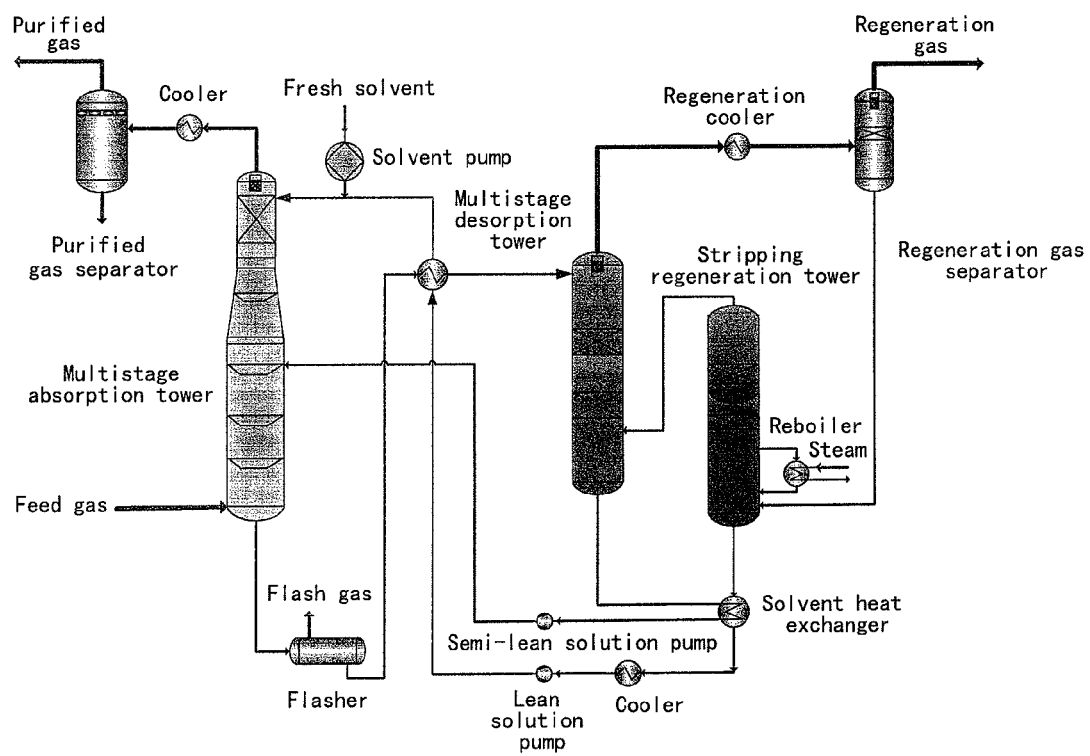
FIG. 2 is a schematic flow chart showing the process of gas purification using the ionic liquid solvent according to the invention.

The production process is shown in FIG. 2. A mixed gas of N₂, SO₂ and CO₂ was used as the feed gas (in a volume ratio of 70:15:15). After pre-heated to 40° C., the gas was pressed into a multistage absorption tower. The feed gas was fed into the lower segment of the tower and an ionic liquid solvent (diethanolamine hydrochloride, diethanolamine, piperazine, tannin and water, in a ratio by weight of 30/30/3/0.5/36.5) was fed into the upper segment of the tower. The temperature and pressure were maintained as 40° C.-60° C. and 0.2-1.5 MPa, respectively inside the multistage absorption tower. In a multistage desorption tower, the gas-rich ionic liquid solvent was desorbed under a pressure of 0.1 MPa -0.3 MPa and at a temperature of 70° C.-120° C. After the desorption, the ionic liquid solvent was recycled into the multistage absorption tower. It was found that using the novel low-energy consuming process, CO₂ with a purity of 99.5% was captured by the capture system used in the novel process, and further refined to generate liquid CO₂ with a purity of 99.997%, which satisfied with the national standard for food. Compared with the energy consumption (3.7 GJ/ton CO₂) involved in the prior processes for absorbing carbon dioxide, >30% energy was saved, which reached the advanced level in the world. Moreover, compared with the prior processes for absorbing carbon dioxide, the total cost for absorbing CO₂ per unit weight of the new absorbent was reduced by 13%; and the CO₂ absorption amount per unit weight of the new absorbent was increased by 10% or above. Furthermore, the new absorbent has a lower volatility, so that <0.5% of the solvent was lost in each cycle during the absorption and desorption of carbon dioxide. The desorption rate was >99%, and the desorption period was shortened by 30% compared with the prior CO₂ absorption processes.

The invention claimed is:

1. An ionic liquid solvent for gas purification and separation, consisting of a main absorbent, a regulator for the main absorbent, an auxiliary absorbent, an activator, an antioxidant and water, wherein based on the total weight of the ionic liquid solvent, the ionic liquid solvent comprises 2-95 wt % of alkylolamine functionalized ionic liquid as the main absorbent; 0-30 wt % of heterocyclic ionic liquid or amino acid ionic liquid as the regulator for the main absorbent; 0.1-30 wt % of alkylolamine organic solvent as the auxiliary absorbent; 0-5 wt % of activator; 0.1-1 wt % of antioxidant and 0.1-50 wt % of water.

2. The ionic liquid solvent according to claim 1, wherein the alkylolamine functionalized ionic liquid, as the main absorbent, has a concentration of 20-80 wt %.

3. The ionic liquid solvent according to claim 1, wherein the regulator for the main absorbent has a concentration of 0.5-5 wt %.

4. The ionic liquid solvent according to claim 1, wherein the alkylolamine organic solvent, as the auxiliary absorbent, has a concentration of 0.5-20 wt %.

5. The ionic liquid solvent according to claim 1, wherein the alkylolamine functionalized ionic liquid has a structural formula of AB, wherein A has a structural formula shown as follow:

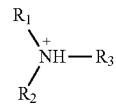

wherein $R_1$, $R_2$, $R_3$ satisfy the following requirements: $R_1$ is $C_nH_{2n+1}OH$ (1≤n≤15), $R_2$ and $R_3$ are H or $C_mH_{2m+1}(OH)_x$ (1≤m≤15, x=1 or 0), respectively; and B is one or more anions selected from the group consisting of Cl⁻, Br⁻, I⁻, $BF_4^-$, $PF_6^-$, OH⁻, $CO_3^-$, $HCO_3^-$, $CH_3COO^-$, RO⁻, PhO⁻, $Tf_2N^-$, $CF_3SO_3^-$, $SbF_6^-$, $SO_4^{2-}$, $HSO_4^-$, $PO_4^{3-}$, $H_2PO_4^-$, $FeCl_4^-$, $AlCl_4^-$, $AlBr_4^-$, $AlI_4^-$, SCN⁻, $NO_3^-$, and $CF_3CF_2CF_2SO_3^-$.

6. The ionic liquid solvent according to claim 1, wherein the heterocyclic ionic liquid, as the regulator for the main absorbent, includes one or more of spiropyrans, furans, pyridines, thiophenes, imidazoles, pyrroles, pyrazoles, azoles, thiazoles, indoles, pyrazines, pyridazines, quinolines, morpholines, quinazolines, piperazines, piperidines, oxazoles, oxazolines and oxazines heterocyclic compound ionic liquids; and the anion of the heterocyclic ionic liquid comprises one or more of Cl⁻, Br⁻, I⁻, $BF_4^-$, $PF_6^-$, OH⁻, $CO_3^{2-}$, $HCO_3^-$, $CH_3COO^-$, RCOO⁻, RO⁻, PhO⁻, $Tf_2N^-$, $CF_3SO_3^-$, $SbF_6^-$, $SO_4^{2-}$, $HSO_4^-$, $PO_4^{3-}$, $H_2PO_4^-$, $FeCl_4^-$, $AlCl_4^-$, $AlBr_4^-$, $AlI_4^-$, SCN⁻, $NO_3^-$ and $CF_3CF_2CF_2SO_3^-$.

7. The ionic liquid solvent according to claim 1, wherein the alkylolamine organic solvent, as the auxiliary absorbent, has a structural formula shown as follow:

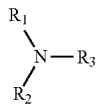

wherein $R_1$, $R_2$, $R_3$ satisfy the following requirements: $R_1$ is $C_nH_{2n+1}OH$ (1≤n≤15), $R_2$ and $R_3$ are H or $C_mH_{2m+1}(OH)_x$ (1≤m≤15, x=1 or 0), respectively.

8. The ionic liquid solvent according to claim 1, wherein the alkylolamine organic solvent, as the auxiliary absorbent, is one or more of ethanolamine, diethanolamine, triethanolamine, N-methyldiethanolamine and diethylene glycol amine.

9. The ionic liquid solvent according to claim 1, wherein the activator is one or more of aminoacetic acid, imidazole, methylimidazole, sulfolane, piperazine, hydroxyethyl diamine, ethylenediamine, and tetramethylpropylenediamine.

10. The ionic liquid solvent according to claim 1, wherein the antioxidant is at least one of hydroquinone, tannin and anthraquinone.

11. A gas purification method using the ionic liquid solvent according to claim 1, wherein the ionic liquid solvent absorbs gas under a pressure of 0.1 MPa-10 MPa, at a temperature of 1° C.-98° C.; and desorbs gas under a pressure of 0.1 MPa-5 MPa, at a temperature of 40° C.-300° C.

12. The method according to claim 10, wherein the gas to be purified include one or more of carbon dioxide, sulfur dioxide, hydrogen chloride, hydrogen sulfide, oxynitride ($NO_x$), sulfoxide ($SO_x$), ammonia, hydrogen, carbon monoxide, methane, ethane, propane, methyl ether, diethyl ether, ethylene, propylene, acetylene, formaldehyde, formic acid, monochloromethane, dichloromethane, chlorine, and oxygen.

13. The method according to claim 10, wherein the absorption of the gas is carried out in a multistage absorption tower.

14. The method according to claim 13, wherein the multistage absorption tower is a bubble tower, a packed tower, or an empty tower.

15. The method according to claim 13, wherein the desorption of the gas is carried out in a multistage desorption tower.

16. The method according to claim 15, wherein the multistage absorption tower and multistage desorption tower have continuously distributed scale-like structures, and the scale-like structures have trapezoidal or rounded cross sections.

17. The method according to claim 15, wherein a fresh solvent and a lean solution, after mixed, are fed through the upper segment of the multistage absorption tower; and a semi-lean solution is fed through the middle of the tower; the two feeding flows are contacted with and absorb the feed gas from the bottom of the tower in a countercurrent; the purified gas is discharged from the top of the tower and enters into the purified gas separator, so as to remove the liquid carried thereby; the absorbed gas enters into the liquid phase and form a rich liquid stream; then the rich liquid stream is discharged from the bottom of the tower and enters into a rich liquid flasher to remove other gases carried thereby; after that, the rich liquid stream is passed through a solvent heat exchanger and enters into the upper segment of the multistage desorption tower; in the multistage desorption tower, the rich liquid stream desorbs thermally and the desorbed gas is discharged from the top of the tower; the discharged gas then is passed through a regeneration cooler and enters a regeneration gas separator to generate a highly purified regeneration gas; the liquid discharged from the bottom of the regeneration gas separator is fed into the bottom of a stripping regeneration tower, and further thermally desorbs; then a full-lean solution is obtained, and discharged from the bottom of the tower; subsequently, the full-lean solution, after subjected a heat exchange with a semi-lean solution discharged from the lower segment of the desorption tower, is passed through a lean solution pump and a heat exchanger, mixed with a fresh solvent, then recycled; the semi-lean solution after the heat exchange is pumped directly into the middle segment of the absorption tower and recycled.

* * * * *